April 10, 1951 W. D. HOUGHTON 2,548,795

PULSE MULTIPLEX SYSTEM

Filed April 22, 1947 3 Sheets-Sheet 1

INVENTOR.

WILLIAM D. HOUGHTON

BY H. S. Grover

ATTORNEY

April 10, 1951 W. D. HOUGHTON 2,548,795
PULSE MULTIPLEX SYSTEM
Filed April 22, 1947 3 Sheets-Sheet 2

INVENTOR.
WILLIAM D. HOUGHTON
BY H. S. Grover
ATTORNEY

April 10, 1951 W. D. HOUGHTON 2,548,795

PULSE MULTIPLEX SYSTEM

Filed April 22, 1947 3 Sheets-Sheet 3

INVENTOR.
WILLIAM D. HOUGHTON

BY H. S. Grover

ATTORNEY

Patented Apr. 10, 1951

2,548,795

UNITED STATES PATENT OFFICE 2,548,795

PULSE MULTIPLEX SYSTEM

William D. Houghton, Port Jefferson, N. Y., assignor to Radio Corporation of America, a corporation of Delaware Application April 22, 1947, Serial No. 743,119

15 Claims. (Cl. 179—15)

This invention relates to time division multiplex systems and more particularly to such systems wherein the different channel units produce amplitude modulated pulses.

As is known, a time division multiplex system is one in which a common output circuit is allotted sequentially to a plurality of channel units for non-overlapping time intervals.

An object of the present invention is to provide an improved multi-channel time division multiplex system in which the pulses from the different channels are amplitude modulated by different program or message waves.

Another object of the present invention is to provide a simple and compact channel unit for use in a multiplex system, in which pulses produced therein are amplitude modulated in accordance with instantaneous amplitude of the modulating signal at the time of pulse occurrence.

A further object is to provide a simple and compact channel unit of the plug-in type which can readily replace a defective channel unit quickly and easily, thus simplifying the maintenance of such systems.

A still further object is to provide a time division multiplex system having a plurality of identical simple and compact plug-in type channel units each of which is adapted to modulate a characteristic of the pulses produced in that channel unit.

A more detailed description of the invention follows in conjunction with a drawing wherein.

Figure 1:
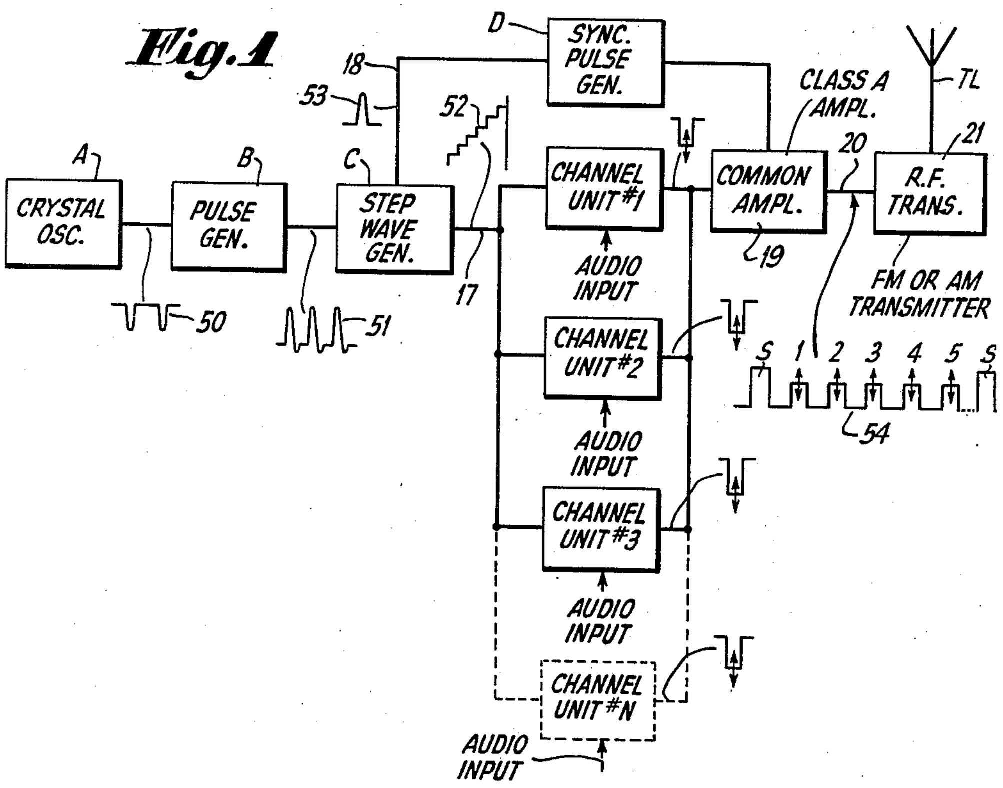
Fig. 1 illustrates, diagrammatically in box form, a complete transmitting system for a pulse type time division multiplex system in which the invention is employed.

Referring to Fig. 1, there is shown a transmitting terminal of a time division multiplex system having a crystal oscillator A which locks in a pulse generator B, in turn, feeding a step wave generator C. The step wave generator C has two outputs, one of which has a step voltage wave having a plurality of risers which is supplied to the inputs of a plurality of channel units 1, 2, 3 . . . N in parallel relation over a lead 17. The other output from the step wave generator C is a pulse occurring on the discharge or termination of the step voltage wave and which is fed over lead 18 to a synchronizing pulse generator D. The outputs from all the channel units and the output from the synchronizing pulse generator D are fed to a common amplifying circuit 19 which, in turn, feeds the combined pulses over lead 20 to a radio frequency transmitter 21 whose output is fed over TL to a suitable wave directive structure as an antenna.

The crystal oscillator A produces short duration pulses of current represented by waveform 50 which feed into and lock by injection the short pulse generator B. The pulse generator B may be of the blocking oscillator type and produces short output pulses represented by the waveform 51 which are applied to the counter or step wave generator C. The resulting step voltage wave from the step wave generator C is represented by waveform 52, while the discharge pulse used for controlling the synchronizing pulse generator D is represented by waveform 53. It will be noted that the step voltage wave 52 produced by the step wave generator comprises a plurality of steps or risers of different voltage values. Stated otherwise, the different risers in the step voltage wave have different voltage values relative to a base line, but these risers preferably have the same or equal amplitude range.

For a more detailed description of the type of circuits which may be used for the crystal oscillator A, the pulse generator B and the step wave generator C and the synchronizing pulse generator D, which of themselves form no part of the present invention per se, but are merely described to illustrate known circuits which can be used in association with the present invention, reference is made to my copending application Serial No. 608,957, filed August 4, 1945, now Patent No. 2,531,817, granted November 28, 1950.

The different channel units 1, 2, 3, etc., each include a channel selector or pulse position selector circuit. The different channel selectors in the different channel units are differently biased to become effective or operative on different risers of the step voltage wave 52. Each channel unit is also provided with means for producing pulses therein and for modulating the amplitude of these pulses with a modulation signal. The different channel units are supplied with different modulating signals or audio input waves. It will thus be seen that the outputs from the different channels occur at different time intervals, and that for each cycle of operation represented by the duration of a single complete step voltage wave there will be a pulse from each channel unit and that these channel pulses occur sequentially. Of course, each cycle of operations will also include a synchronizing pulse which occurs at the end of the step voltage wave, or after all the channels have each produced one pulse. It is preferred that the synchronizing pulse be of longer duration than any of the channel pulses and of an amplitude equal to or slightly greater than the maximum amplitude of any channel pulse under extremes of modulation.

The synchronizing pulse and the channel pulses as they appear in the output of the common amplifier 19 is represented by waveform 54. Thus each cycle of operations will include a synchronizing pulse and also a plurality of channel pulses one for each channel, suitably spaced apart and occurring sequentially. The arrows on the channel pulses 1, 2, 3, 4 . . . N of waveform 51 indicate that the amplitudes of the channel pulses vary in accordance with the modulation.

The radio frequency transmitter 21 may be any suitable radio frequency oscillator which is modulated by the pulses supplied thereto. It is preferred that this transmitter be a frequency modulation transmitter whose frequency is modulated in accordance with the amplitude of the pulses in lead 20. If desired, the amplitude of the carrier waves produced by the transmitter 21 may, as an alternative, be modulated in accordance with the amplitude of the pulses in lead 20.

Figure 2:
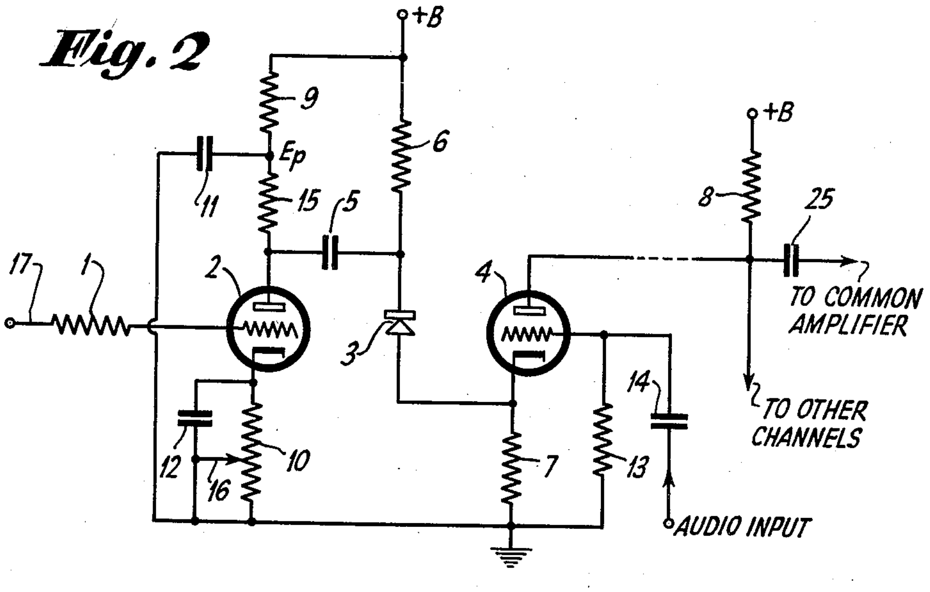
Fig. 2 illustrates, schematically, the circuit details of a single channel unit of the invention.

Referring to Fig. 2 which shows one of the channel units in the multiplex system of Fig. 1, there are shown a pair of vacuum tube triode circuits 2, 4, illustrated as individual tubes although, if desired, both electrode structures may be included in a single evacuated envelope. The grid of triode 2 is supplied with the step voltage wave from lead 17 through a grid current limiting resistor 1. The anode of triode 2 is supplied with a positive anode polarizing potential through resistors 9 and 15. The cathode of triode 2 is connected to ground through a resistor 10 across which there is provided a bypass condenser 12. A suitable tap 16 serves to adjust the bias on the triode 2. Another bypass condenser 11 is connected between ground and the junction point of the resistors 9 and 15. Normally, triode 2 is nonconductive. The tap point 16 is so arranged that the triode 2 becomes conductive on a particular riser of the applied step voltage wave appearing on lead 17. As mentioned before, the different triodes in the different channel units are differently biased to become conducting on different risers of the step voltage wave.

The amplitude of the step riser on which each channel unit is designed to become effective or operative, is sufficient to drive tube 2 from below cut-off to zero grid-to-cathode potential. Once tube 2 becomes conductive, it will remain conductive for the duration of the applied step wave, and the grid-to-cathode potential will be zero for the remainder of the applied step wave.

The cathode of triode 4 is connected to ground through cathode resistor 7, and is also connected through a rectifier 3 and a resistor 6 in series to the positive D. C. anode polarizing potential +B for tube 2. Rectifier 3 may be a germanium rectifier, or a vacuum tube diode or any suitable aprectifying device so arranged that its anode is connected to resistor 6, as a result of which current will normally flow through the series circuit of resistor 6, rectifier 3 and resistor 7. Resistor 7 has a value so chosen that under this normal condition a voltage is developed thereacross due to the flow of current through rectifier 3 of a value which biases tube 4 below cut-off. The grid of triode 4 is connected to ground through a resistor 13, and is also connected to a source of modulating potential, herein indicated as "audio input," through condenser 14. The anode of triode 4 is connected through a resistor 8 to a low value of D. C. anode potential +B′. By way of example only, +B′ may supply 75 volts of potential which is positive relative to ground whereas +B may have a value of 300 volts positive potential relative to ground. Of course, if desired, tube 4 could have the same B+ value as tube 2, but it would then require a larger bias voltage across resistor 7. The optimum values depend upon the type of tube 4 used. The anode of tube 4 is also connected to the anodes of tubes 4 of the other channel units and to the common amplifier via coupling condenser 25.

It should be noted that the anode of triode 2 is connected to the anode of rectifier 3 by means of a condenser 5. When tube 2 becomes conducting on a particular riser of the applied step voltage wave, its anode potential suddenly drops to a low value and remains at this value for the remainder of the applied step voltage wave. The leading edge of the negative pulse produced on the anode of tube 2 is differentiated by the differentiating network of condenser 5 and resistor 6, thus producing a negative pulse on the anode of rectifier 3 sufficient to cause the cessation of current through the rectifier. The cessation of current through rectifier 3 reduces the voltage developed across resistor 7, thus allowing tube 4 to conduct and operate as a class A amplifier. After a short period of time, the pulse from the differentiating network developed across the anode of rectifier 3 ceases thus allowing rectifier 3 to become conducting and permit a voltage to be developed across resistor 7 of a value which biases tube 4 to below cut-off. It will thus be seen that tube 4 is conductive for a very short period of time corresponding to the duration of the negative going differentiated impulse. When tube 4 becomes conductive, there is developed a negative pulse across resistor 8 the amplitude of which is a function of the amplitude of the audio modulating signal on the grid of tube 4 at the time it is conducting.

Figure 3:
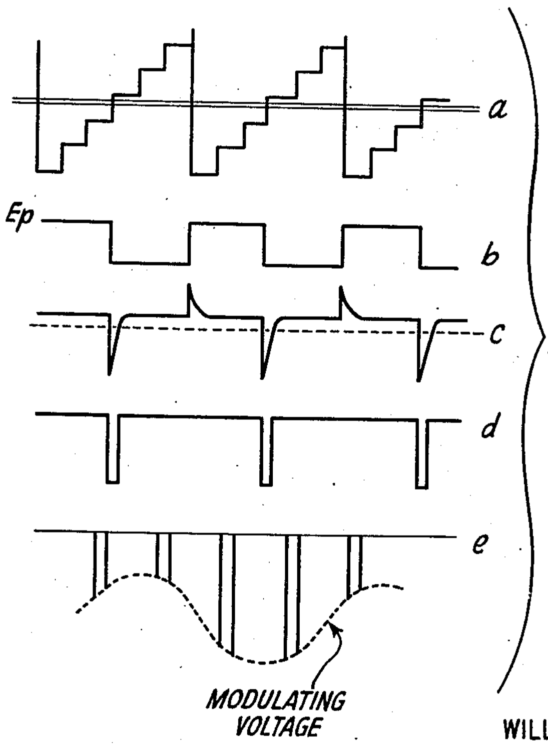
Fig. 3 is a series of curves given in explanation of the operation of the channel unit of Fig. 2.

The operation of the system of Fig. 2 may be better understood by reference to the curves of Fig. 3 in which *a* illustrates by way of example, a series of step voltage waves applied to the grids of the different tubes 2 of the different channel units. Assuming, for example, this tube 2 of Fig. 2 is so biased by the tap 16 on the resistor 10 that it becomes conducting on the third riser of the step voltage wave as indicated by the horizontal lines in curve *a*, the resultant voltage drop on the anode of tube 2 is represented by curve *b* which shows a series of negative going pulses which occur on the third riser of the step voltage wave. Curve *c* represents the differentiated impulses occurring across rectifier 3. It will be seen that sharply peaked negative differentiated impulses occur on the leading edges of the negative pulses of curbe *b*. The dash line of curve *c* represents the potential below which rectifier 3 becomes non-conducting. The negative impulse of curve *d* represents the voltage pulses appearing across resistor 7. The waveform of curve *e* represents the amplitude modulated pulses as they appear across resistor 8 for one audio modulating cycle.

In the multi-channel system, pulses from other channel units occupy the time interval between adjacent pulses in curve *e*. The audio modulating voltage is represented by the sinuous curve in curve *e*.

Figure 5:
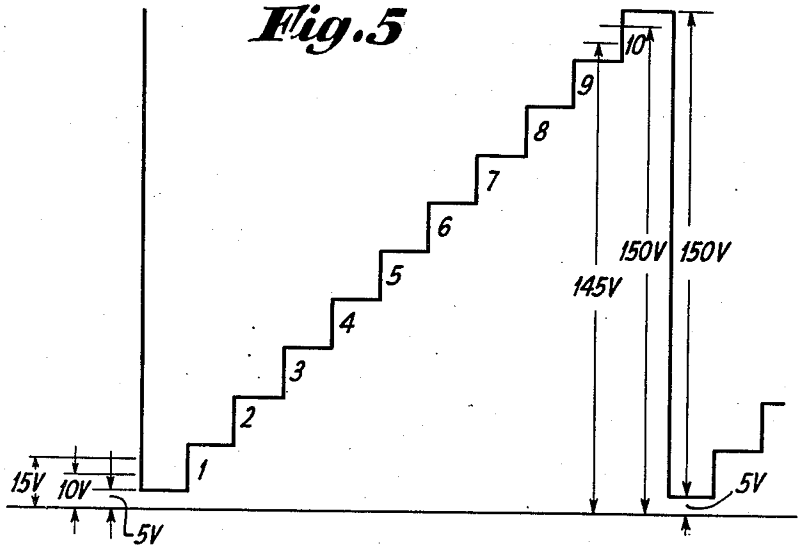
Fig. 5 is a graph of the step voltage wave output of the step generator given in explanation of the operation of the channel selector circuit in a channel unit.

The network containing resistor 9 and condenser 11 forms a compensating network similar to that described in connection with the channel selector of my copending application Serial No. 608,957, supra. The operation of this is as follows:

Assume the step wave applied to the grid of tube 2 has an amplitude of 150 volts, as shown in Figure 5, and consists of 10 steps or risers each with an amplitude of 15 volts. Also assume the cut-off potential of tube 2 to be 5 volts, that is, tube 2 requires 5 volts to drive its grid from cut-off to zero grid-to-cathode potential. Further assume the bottom of the stair (the portion immediately following the discharge and preceding number one riser) is at a positive potential of approximately 5 volts relative to ground. This is the case practically, since with a cathode follower stage there is a positive voltage developed when its grid is zero, assuming the use of a cathode follower tube between the step voltage wave output of the step wave generator and the inputs to the channel selector tubes. In the circuits which I have been using, this voltage is approximately 5 volts. The result is the peak amplitude of the 150 volt step wave is actually 155 volts relative to ground or zero D. C. potential.

When tube 2 is made conducting on #1 riser, its cathode potential is set at +15 volts and since the cut-off potential of tube 2 is 5 volts (as assumed earlier) it will start to conduct when the potential on its grid reaches 10 volts and will reach zero grid-to-cathode potential when its grid-to-ground potential reaches 15 volts. From an inspection of Figure 5 it will be seen that these two points are located about the middle of the #1 riser, the 10 volt potential being at a point which is one-third the amplitude of the riser and the 15 volt point being at a point which is two-thirds the amplitude of the riser.

When tube 2 is made conducting on #10 riser, its cathode potential is set at +150 volts and since the cut-off potential is 5 volts it will start to conduct when the grid to ground potential reaches +145 volts and reaches zero grid-to-cathode potential when the grid-to-ground potential reaches +150 volts. As will be seen from the drawing, these points fall at one-third and two-thirds the amplitude of the last or #10 riser.

When tube 2 is conducting on #1 riser, it carries current for $^{10}/_{11}$ or 91% of the time or duration of each step wave or cycle. When it is made operative on the #10 riser, it carries current for $^{1}/_{11}$ of 9.1% of the time. The value of resistor 9 is so chosen that when tube 2 is operative on the 1st riser, the potential developed across resistor 9 is 150 volts D. C. That is, the potential at $E_p$ is 150 volts when +B is 300 volts. When tube 2 is conducting on the last riser, the average current will be 0.1 of what it was on #1 riser, therefore the drop across resistor 9 will be 0.1×150, or 15 volts D. C.

Hence, when tube 2 is operative on #1 riser, its cathode is at a D.-C. potential of +15 volts D. C. and the point $E_p$ is 150 volts D. C., resulting in the anode-to-cathode potential being 135 volts D. C. prior to conduction. When tube 2 is made operative on #10 riser its cathode is at a D.-C. potential of 150 volts D. C. and the point $E_p$ is at 285 volts D. C., resulting in the anode-to-cathode potential remaining 135 volts D. C.

By similar analysis, it can be shown that the anode-to-cathode potential remains 135 volts regardless of the position or riser upon which tube 2 is made operative. It will readily be seen that the output voltage pulse will have the same amplitude regardless of the riser on which tube 2 is made operative. Since the duration of pulse across resistor 7 is a function of the amplitude of pulse across the anode of rectifier 3, which in turn is a function of the negative going amplitude of the voltage wave at the anode of tube 2, the duration will remain constant regardless of channel position.

If the value of resistor 9 were zero and +B were +300 volts, the potential at point $E_p$ would also be +300 volts and when tube 2 is made operative on #1 riser the cathode potential again would be approximately 15 volts D. C., resulting in an anode-to-cathode potential of 285 volts D. C. prior to conduction. If tube 2 were made operative on #10 riser, the cathode potential would be +150 volts D. C., resulting in an anode-to-cathode potential of 150 volts prior to conduction. The result is that the negative going amplitude of the wave at the anode of tube 2 would be nearly twice as great when tube 2 conducts on #1 riser than on #10 riser. This would result in the width of the pulse across resistor 7 being considerably greater when the channel unit is operative in the first position than when operating in the last position (approximately 2:1).

In some situations it has been found possible to eliminate resistor 9 and condenser 11 and to allow the width of the individual channel pulses to vary, particularly in those systems where the channel pulses are gated and converted to short constant length pulses in a common converter circuit. However, if the number of channels were increased it would be necessary to use 9 and 11 since the allowable overlap of channel pulses (between adjacent banks) would be reduced to a point where cross talk would be introduced unless the widths were held constant.

Figure 4:
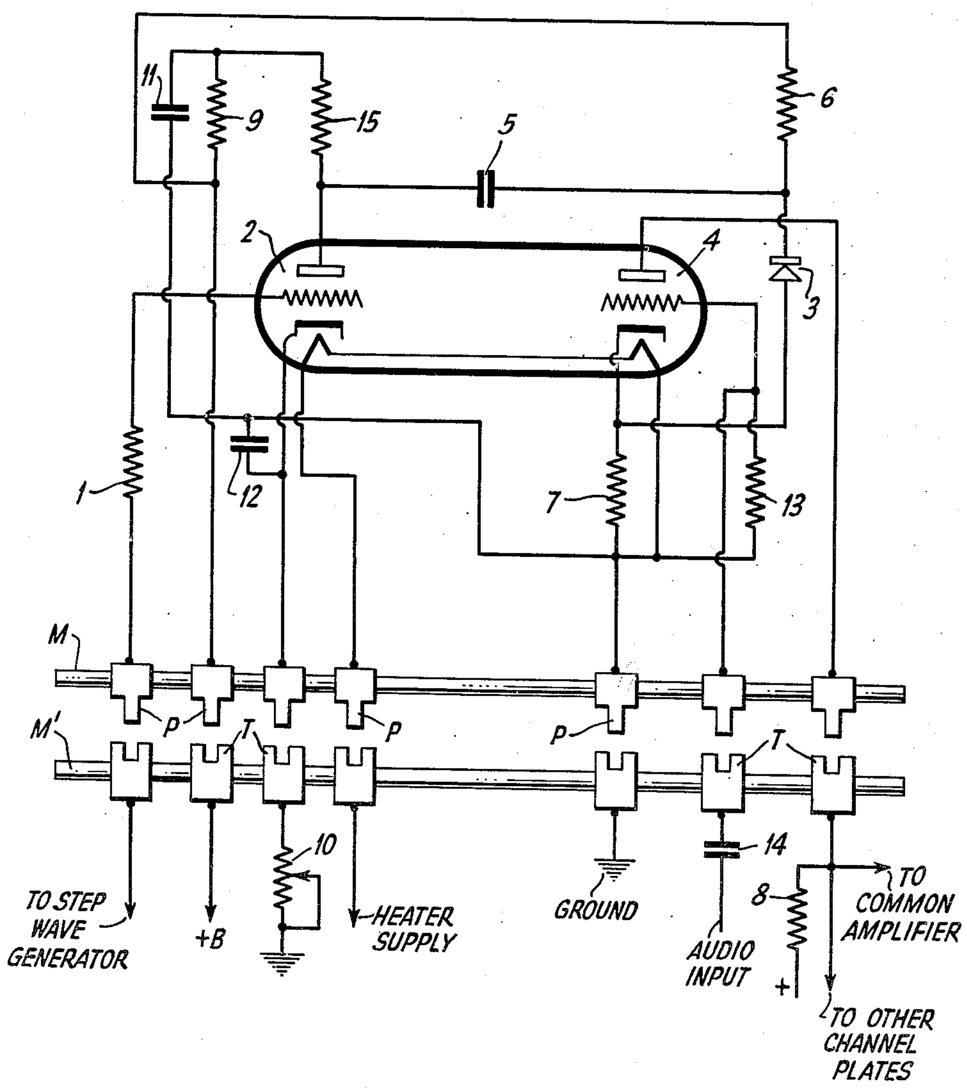
Fig. 4 illustrates the mechanical construction of a plug-in-type channel unit having the circuit details of Fig. 2.

Fig. 4 shows, by way of example, how the channel unit can be arranged as a plug-in type construction. Electrode structures 2 and 4 of Fig. 2 are shown as a single dual triode tube having a single evacuated envelope. The same parts in Figs. 2 and 4 are designated by the same reference numerals. The various circuit elements of Fig. 2 are shown in Fig. 4 connected to different metallic pins P, in turn, mounted on an insulating base M. These pins are adapted to be inserted into metallic female members T which are correspondingly positioned and mounted on an insulating base M'. It will be noted that the biasing resistor 10 for the cathode of electrode structure 2 is shown connected to one of the female members T, thus permitting adjustment of the bias of the channel unit externally without destroying the plug-in construction. In this way all channel plug-in units can be identically arranged and readily replaced quickly and efficiently in the same length of time it would ordinarily take to replace the plug-in type of vacuum tube in a conventional transmitting or receiving radio set. Each channel unit may be quite compact and may contain a metallic can having the size of 1½" x 1½" x 6", which is approximately the size of a conventional I. F. transformer. By arranging all channel units to be identical and of the plug-in type, it is only necessary to have a few such channel units as operating spares, thus greatly simplifying the equipment.

What is claimed is:

1. A pulse generating system comprising a first electron discharge electrode structure biased to cut-off, a second electron discharge device electrode structure having a cathode resistor, means developing a voltage across said cathode resistor of a value sufficient to prevent the flow of current through said second electrode structure, a connection between said first structure and said means for rendering said means ineffective to develop said voltage across said cathode resistor in response to the flow of current in said first structure, an impedance connected to said second structure and across which a pulse of voltage is developed when said second structure becomes conductive, and means coupled to said first structure for applying recurring waves to thereby periodically overcome the cut-off bias on said first structure.

2. A pulse generating system comprising a first electron discharge electrode structure biased to cut-off, a second electrode discharge device electrode structure having a cathode resistor, means developing a voltage across said cathode resistor of a value sufficient to prevent the flow of current through said second electrode structure, a connection between said first structure and said means for rendering said means ineffective to develop said voltage across said cathode resistor in response to the flow of current in said first structure, a load resistor connected to said second structure and across which a pulse of voltage is developed when said second structure becomes conductive, a source of modulating potential coupled to said second structure, and means for applying recurring waves to said first structure to thereby periodically overcome the cut-off bias on said first structure.

3. A pulse generating system comprising a first electron discharge electrode structure biased to cut-off, a second electron discharge device electrode structure having a cathode resistor, means developing a voltage across said cathode resistor of a value sufficient to prevent the flow of current through said second electrode structure, a differentiator circuit coupled between said first and second structures and responsive to the flow of current in said first structure for rendering said means ineffective to prevent the flow of current through said second structure, a load resistor connected to said second structure and across which a pulse of voltage is developed when said second structure becomes conductive, a circuit coupled to said second structure for applying modulating potential thereto, and means coupled to said first structure for applying recurring waves to thereby periodically overcome the cut-off bias on said first structure.

4. A pulse generating system comprising a circuit adapted to carry recurring step voltage waves, a first electron discharge device electrode structure normally biased to cut-off and coupled to said circuit, the value of said bias being such that said structure becomes conductive on a particular riser of the applied step voltage wave, a second electron discharge device electrode structure having a cathode resistor, a series circuit of a rectifier and another resistor connected between said first resistor and a source of D. C. potential, the rectifier being so poled that current flows through said series circuit and said cathode resistor, to thereby develop a voltage across said cathode resistor of a magnitude sufficient to cut-off the flow of current through said second structure, a condenser between the output electrode of said first structure and the junction point of said rectifier and resistor in said series circuit, said condenser and last resistor forming a differentiator circuit, a load resistor coupled to the output of said second structure, and a circuit coupled to said second structure for applying modulating potentials thereto.

5. A pulse generating system comprising first and second vacuum tube electrode structures each having a cathode, a grid and an anode, a circuit adapted to carry recurring step voltage waves coupled to the grid of said first structure through a current limiting resistor, an adjustable element in circuit with the cathode of said first structure for biasing said first structure to the anode current cut-off condition, said first structure being biased to become conductive on a particular riser of the applied step wave, a source of direct current having its positive terminal connected to the anode of said first structure through a D.-C. impedance, a cathode resistor connected to the cathode of said second structure, a series circuit of another resistor and rectifier connected between said positive terminal and said cathode resistor, said rectifier being so poled that current normally flows therethrough and through said cathode resistor, thereby developing a voltage across said cathode resistor which biases said second electrode structure to cut-off, a condenser connected between the anode of said first structure and the junction point of the rectifier and other resistor in said series circuit, said condenser and said last resistor forming a differentiator circuit, a load resistor connected to the anode of said second structure, and a circuit coupled to the grid of said second structure for applying modulating potentials thereto.

6. A pulse generating system comprising first and second vacuum tube electrode structures each having a cathode, a grid and an anode, a circuit adapted to carry recurring step voltage waves coupled to the grid of said first structure through a current limiting resistor, an adjustable element in circuit with the cathode of said first structure for biasing said first structure to the anode current cut-off condition, said first structure being biased to become conductive on a particular riser of the applied step wave, a source of direct current having its positive terminal connected to the anode of said first structure through a D.-C. impedance, a cathode resistor connected to the cathode of said second structure, a series circuit of resistor and rectifier connected between said positive terminal and said cathode resistor, said rectifier being so poled that current normally flows therethrough and through said cathode resistor, thereby developing a voltage across said cathode resistor which biases said second electrode structure to cut-off, a condenser connected between the anode of said first structure and the junction point of the rectifier and resistor in said series circuit, said condenser and said last resistor having such constants as to form a differentiator circuit which produces a negative pulse in response to the start of the flow of current through said first structure, the peak value of said negative pulse being such as to prevent momentarily the flow of current through said rectifier, as a result of which said second structure momentarily passes current, a load resistor coupled between the anode of said second structure and a source of anode polarizing potential, the value of the anode polarizing potential supplied to said second structure being less than that supplied to said first structure, and a circuit coupled to the grid of said second structure for applying modulating potentials thereto.

7. In a multiplex time division system a pulse generator, a step voltage wave generator coupled to said pulse generator and producing recurring step waves each having a plurality of steps or risers of different voltage values relative to a base line, a plurality of channel circuits having their inputs coupled in parallel to said step wave generator, each channel circuits having a selector tube, the selector tubes in the different channel circuits being differently biased to become operative on different risers of the applied step wave, an electron discharge device electrode structure coupled to the output of each selector tube through a rectifier for producing a pulse and for modulating the amplitude of said pulse in accordance with a modulating signal at the time the selector tube in that channel becomes operative, means controlled by the step wave generator for producing a synchronizing pulse at a time different from the times of occurrence of the channel pulses and having an amplitude at least equal to the maximum amplitude of the channel pulses under extremes of modulation, but of longer duration, and a common amplifier circuit coupled to the output of said last means and to the outputs of all of said channel circuits for combining the amplitude modulated channel pulses and the synchronizing pulse.

8. In a pulse generating multiplex system, a plurality of channel circuits, a source of recurring waves coupled to and controlling said channel circuits to produce sequentially occurring amplitude-modulated pulses, each of said channel circuits including a first normally non-conductive vacuum tube electrode structure coupled to said source of recurring waves and biased to become conductive at a particular region of the recurring wave, a second normally non-conductive vacuum tube electrode structure coupled to said first structure through a rectifier and differentiator arrangement to thereby become conductive for only a portion of the time of conductivity of said first structure, and a source of modulating potential coupled to said second structure, the first electrode structures of the different channel circuits being differently biased, and a pulse combining circuit coupled in common to the output electrodes of the second structures of said channel circuits.

9. The method of producing an amplitude modulated pulse which includes the steps of generating a voltage wave, causing a space flow of electrons when said voltage wave reaches a predetermined value, utilizing said space flow of electrons to produce another space flow of electrons of shorter time duration than said first space flow, and modulating the intensity of the shorter duration space flow in accordance with a modulating signal.

10. A pulse generating system comprising a first electron discharge electrode structure having a cathode, a grid and an anode, and biased to cut-off, a second electron discharge device electrode structure having a cathode resistor, means developing a voltage across said cathode resistor of a value sufficient to prevent the flow of current through said second electrode structure, a differentiator circuit coupled between the anode of said first structure and the cathode of second structure and responsive to the flow of current in said first structure for rendering said means ineffective to prevent the flow of current through said second structure, a load resistor connected to said second structure and across which a pulse of voltage is developed when said second structure becomes conductive, a circuit coupled to said second structure for applying modulating potential thereto, and means coupled to the grid of said first structure for applying recurring waves to thereby periodically overcome the cut-off bias on said first structure.

11. A pulse generating system comprising a circuit adapted to carry recurring step voltage waves, a first electron discharge device electrode structure normally biased to cut-off and coupled to said circuit, the value of said bias being such that said structure becomes conductive on a particular riser of the applied step voltage wave, a second electron discharge device electrode structure having a cathode resistor, a series circuit of a rectifier and an impedance capable of passing direct current connected between said first resistor and a source of D. C. potential, the rectifier being so poled that current flows through said series circuit and said cathode resistor, to thereby develop a voltage across said cathode resistor of a magnitude sufficient to cut-off the flow of current through said second structure, a condenser between the output electrode of said first structure and the junction point of said rectifier and impedance in said series circuit, said condenser being so related to said impedance that upon the flow of current through said first electron discharge device structure the flow of current through said second electron device structure ceases for a short period of time compared to the duration of current flow through said first electron discharge device structure, a load resistor coupled to the output of said second structure, and a circuit coupled to said second structure for applying modulating potentials thereto.

12. A pulse generating system comprising a first electrode structure having a cathode, a grid and an anode, means in circuit with said cathode for biasing said first structure to the cut-off condition, a connection to said grid for supplying recurring waves thereto of such polarity and magnitude as to overcome the cut-off bias on said first structure, a resistor network connecting said anode to the positive terminal of a source of unidirectional potential, a condenser connecting said cathode to a point on said resistor network intermediate its ends, a second electrode structure having a cathode resistor, a coupling between said anode of the first structure and a point on said cathode resistor including means developing a voltage across said cathode resistor of a value sufficient to prevent the flow of current through said second electrode structure in the absence of the flow of current in said first structure, and an impedance coupled to said second structure for developing a pulse of voltage thereacross when said second structure becomes conductive.

13. A pulse generating system comprising a circuit adapted to carry recurring step voltage waves, a first electron discharge device electrode structure normally biased to cut-off and coupled to said circuit, the value of said bias being such that said structure becomes conductive on a particular riser of the applied step voltage wave, a second electron discharge device electrode structure having a cathode resistor, a series circuit of a rectifier and an impedance capable of passing direct current connected between the cathode terminal of said first resistor and a source of D. C. potential, the rectifier being so poled that current flows through said series circuit and said cathode resistor, to thereby develop a voltage across said cathode resistor of a magnitude sufficient to cut-off the flow of current through said second structure, a condenser between the output electrode of said first structure and the junction point of said rectifier and said impedance in said series circuit, a load impedance coupled to said second structure, and a circuit coupled to said second structure for applying modulating potentials thereto.

14. The method of producing an amplitude modulated pulse which includes the steps of generating a voltage wave, causing a space flow of electrons when said voltage wave reaches a predetermined value, converting said space flow of electrons into two spaced voltage impulses of opposite relative polarities occurring at times corresponding to the start and stop of said flow of electrons, controlling the flow of electrons over another space path by one of said voltage impulses of a predetermined polarity, and modulating the intensity of said last flow of electrons in accordance with a modulating signal.

15. In combination in a pulse system, first and second vacuum tube electrode structures each having an anode, a cathode and control electrode, means for baising said first and second structures to the anode current cut-off condition, a connection to the control electrode of said first structure for supplying thereto waves of such polarity and magnitude as to overcome the cut-off bias thereof, means including a reactance element coupling the anode of said first structure and the cathode of said second structure for intermittently biasing said second structure to operate Class A in response to the flow of current through said first structure, and means for applying modulation to the grid of said second structure.

WILLIAM D. HOUGHTON.

REFERENCES CITED

The following references are of record in the file of this patent:

UNITED STATES PATENTS

| Number | Name | Date |
|---|---|---|
| 2,199,634 | Koch | May 7, 1940 |
| 2,280,693 | Evans | Apr. 21, 1942 |
| 2,403,210 | Butement | July 2, 1946 |
| 2,413,440 | Farrington | Dec. 31, 1946 |
| 2,420,374 | Houghton | May 13, 1947 |
| 2,421,676 | Beard | June 3, 1947 |
| 2,428,913 | Hulst | Oct. 14, 1947 |
| 2,438,371 | Marholz | Mar. 23, 1948 |

OTHER REFERENCES

Radio-Craft, January 1939, pp. 400–401.

TM—11—1085, Radar Search Central AN/TPQ—1 dated March 30, 1945.